July 19, 1955 W. N. COFFEY 2,713,651

AMPLIFIER CIRCUIT

Filed March 23, 1951

Inventor:
William N. Coffey,
by Merton D. Moore
His Attorney.

United States Patent Office 2,713,651

Patented July 19, 1955

2,713,651

AMPLIFIER CIRCUIT

William N. Coffey, Scotia, N. Y., assignor to General Electric Company, a corporation of New York Application March 23, 1951, Serial No. 217,217

5 Claims. (Cl. 315—27)

The present invention relates in general to amplifier circuits and in particular to new and improved circuit means in a saw tooth wave amplifier for supplying linear deflection currents for cathode ray tubes.

In the television art, vertical deflection currents are supplied to the deflection coil of a cathode ray tube through an amplifier which is driven by a linear saw tooth wave generator. The present invention is directed in particular to providing improvements in deflection systems of this general character.

An object of the present invention is to provide improvements in amplifier circuits.

It is also an object of the present invention to provide an improved saw tooth wave amplifier.

It is another object of the present invention to provide circuit means in an amplifier whereby linear output currents are developed by the amplifier in accordance with the linear saw tooth wave voltage applied to the amplifier.

It is still another object of the present invention to provide deflection circuits having good linearity for use with cathode ray tubes. It is a further object of the present invention to provide cathode ray tube deflection circuits which require a minimum number of controls, which are relatively insensitive to power supply variations and which substantially eliminate cross coupling from the horizontal deflection coils to the vertical deflection coils of the cathode ray tube.

Figure 1:
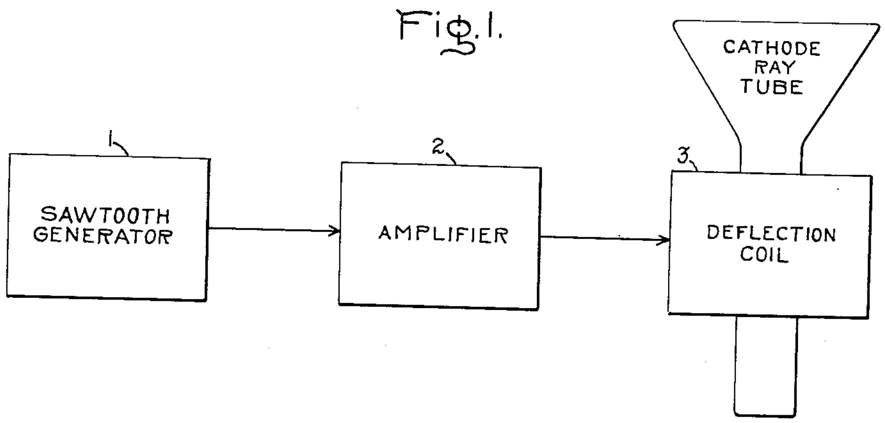
Figure 2:
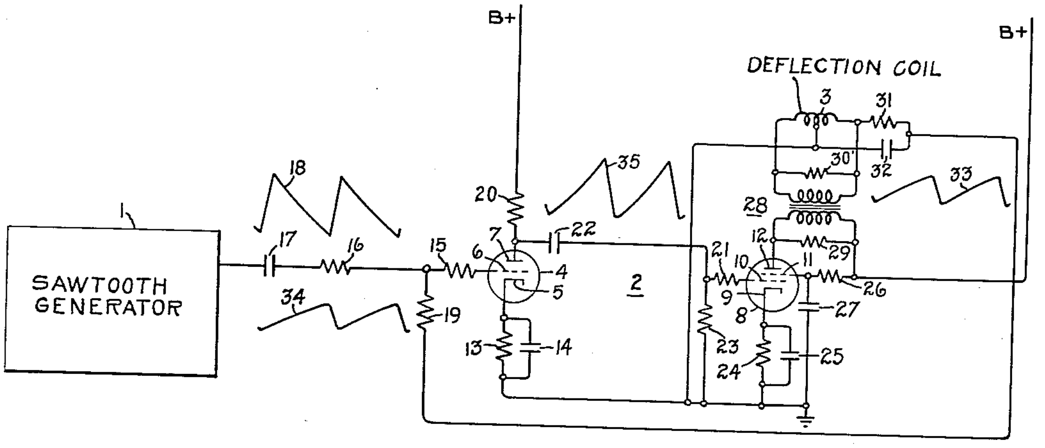

The novel features which I believe to be characteristic of my invention are set forth with particularity in the appended claims. My invention, however, both as to its organization and method of operation, together with further objects and advantages thereof may best be understood by reference to the following description taken in connection with the accompanying drawings in which Fig. 1 is a block diagram of apparatus for producing deflection currents in cathode ray tube deflection coils; Fig. 2 is a schematic diagram of circuits embodying my invention.

Referring to Fig. 1 of the drawing, there is shown a block diagram of a conventional deflection circuit for a cathode ray tube comprising a generator of linear saw tooth waves 1, an amplifier 2 and a deflection coil 3. The amplifier 2 develops currents, in response to the voltage supplied from the generator 1, having an instantaneous amplitude which is proportional to the saw tooth voltage. The currents from the amplifier 2 are supplied to the deflection coil 3 which deflects the beam of the cathode ray tube in response thereto.

Referring now to Fig. 2 of the drawing, there is shown an exemplary embodiment of my invention. The amplifier 2 comprises an electron discharge device 4 having a cathode 5, a grid 6 and an anode 7 and an electron discharge device 8, having a cathode 9, a grid 10, a screen grid 11 and an anode 12. The cathode 5 is connected through a cathode resistor 13 to ground. The cathode resistor 13 is by-passed by self-bias capacitor 14. The grid 6 is connected through a parasitic eliminating resistor 15, isolation resistance 16, coupling capacitor 17 to the saw tooth generator of voltage 1. The sawtooth wave generator 1 develops a linear saw tooth wave of voltage as shown in the graph 18. The grid 6 is also connected through resistance 15 and isolation resistance 19 to the deflection coil 3 in a manner to be hereinafter described. The anode 7 is connected through an anode resistance 20 to the positive terminal of a source of unidirectional potential.

This grid 10 is connected through parasitic eliminating resistance 21 and coupling capacitor 22 to the anode 7. Grid leak resistance 23 is connected from the junction of resistance 21 and capacitor 22 to ground. The cathode 9 is connected through cathode resistance 24 to ground. Cathode resistance 24 is by-passed by capacitor 25. The screen 11 is connected through screen dropping resistor 26 to the positive terminal of the unidirectional source of potential. Screen 11 is by-passed to ground through capacitor 27. The anode 12 is connected through the primary winding of output transformer 28 to positive terminal of the unidirectional source of potential.

The secondary winding of transformer 28 is connected to the deflection coil 3 to supply deflection currents thereto. Resistances 29 and 30 are loading resistances which function to aid in the damping of the transients developed by the sawtooth wave retrace interval. The center tap of coil 3 is connected to ground. A series combination of resistances 31 and capacitance 32 is connected from one end of the coil 3 to the center tap of the coil 3 in that order. The ungrounded terminal of capacitor 32 is connected through the aforementioned resistance 19 to the grid 6.

The time constant of the resistance 31 and the capacitor 32 is made substantially equal to the time constant of the portion of the coil shunted thereby. The series impedance comprising the resistance 31, the capacitor 32 is made substantially larger than the impedance of the coil 3. When these conditions are met, the waveform of voltage developed across the capacitor 32 is proportional to the current flowing through the coil 3, that is, the wave shape of current flowing through coil 3 is the same as the wave shape of voltage developed across the capacitor 32. The resistance 31 and capacitor 32 shunts that side of the coil 3 which will develop the proper phase of voltage across capacitor 32 as shown in the graph 33.

In operation, the linear saw tooth wave 18 and the inverse feedback voltage wave 34, which is the voltage wave 33 reduced in amplitude, is applied to the grid 6. If any distortion appears in the amplifier system, the wave form 33 is distorted as shown. This distortion may be caused by operation of the amplifier tubes on a non-linear part of their plate current-grid voltage characteristics or by the magnetization current drawn by transformer 28, for example. The distortion of wave form 33 is shown magnified for the purposes of explanation of the invention.

The waveforms 18 and 34 are additively applied at the grid 6 developing in the output circuit of the device 4 a voltage wave having a curvature which is the inverse of the curvature of waveform 34 as shown in graph 35. The waveform 35 is applied to the grid 10 which preferably comprises a tetrode type electron discharge device which has high internal plate impedance with respect to the impedance of the deflection coil 3 and which develops current in its output circuit in accordance with the voltage applied to the grid 10. Accordingly, the waveform 35 of voltage applied to the grid 10 develops a waveform of current in the primary winding of the transformer 28, and consequently in the coil 3, which is the inverse of the waveform 33. Thus it is seen that the waveform 33 represents the "error" waveform which causes the development of a signal in the grid 10 which opposes any departure from linearity in the current developed in the coil 3.

The circuit comprising resistance 31 and capacitance 32 also functions as a low pass filter to eliminate cross coupling of signals from the horizontal deflection coil of the cathode ray tube to the vertical deflection coil thereof which interferes with the normal operation of the amplifier 2.

While I have shown a particular embodiment of my invention, it will, of course, be understood that I do not wish to be limited thereto since many modifications, both in the circuit arrangement and in the instrumentalities employed, may be made, and I, therefore, contemplate by the appended claims to cover any such modifications as fall within the true spirit and scope of my invention.

What I claim as new and desire to secure by Letters Patent of the United States is:

1. In combination, an amplifier having an input circuit and an output circuit including an inductive element, a series combination of a resistance and capacitance in shunt with said inductive element, means for applying a linear sawtooth wave of voltage to said input circuit, circuit means connecting the output voltage developed across said capacitance to said input circuit in phase opposition to said sawtooth wave, the time constant of said series combination being substantially equal to the time constant of said inductive element, whereby said linear sawtooth wave of voltage is reproduced as a linear sawtooth wave of current in said inductive element.

2. In combination, an amplifier having an input circuit and an output circuit including an inductive load element and an electron discharge device having an internal plate impedance substantially greater than the inductive impedance of said element, a series combination of a resistance and capacitance in shunt with said inductive element, means for applying a linear sawtooth wave of voltage to said input circuit, circuit means connecting the output voltage developed across said capacitance to said input circuit in phase opposition to said sawtooth wave, the time constant of said series combination being of the order of magnitude of the time constant of said inductive element whereby said linear sawtooth wave of voltage develops a linear sawtooth wave of current in said inductive element.

3. In combination, an amplifier having an input circuit and an output circuit, a cathode ray tube deflection coil connected in energizeable relationship to said output circuit, means for applying a linear sawtooth wave of voltage to said input circuit, a series combination of resistance and capacitance connected in shunt with at least a portion of said deflection coil, means for applying the voltage wave developed across said capacitance in inverse phase with respect to said sawtooth wave to said input circuit, the series impedance of said series combination being substantially greater than the impedance of said coil shunted thereby, said resistance and capacitance having values with respect to the inductance and resistance of said portion of said coil whereby said linear sawtooth wave of voltage is reproduced as a linear sawtooth wave of current in said deflection coil.

4. In combination, an amplifier having an input circuit and an output circuit, a cathode ray tube deflection coil connected in energizeable relationship to said output circuit, means for applying a linear sawtooth wave of voltage to said input circuit, a series combination of resistance and capacitance connected in shunt with at least a portion of said deflection coil, means for applying the voltage wave developed across said capacitance in inverse phase with respect to said sawtooth wave to said input circuit, the series impedance of said series combination being substantially greater than the impedance of said coil, and the time constant of said combination being substantially equal to the time constant of the portion of the coil shunted thereby whereby said linear sawtooth wave of voltage is reproduced as a linear sawtooth wave of current in said deflection coil.

5. In combination, an amplifier having an input circuit and an output circuit, a cathode ray tube deflection coil having a ground point and connected in energizeable relationship to said output circuit, said output circuit including an electron discharge device having an internal impedance substantially greater than the inductive impedance of said coil, means for applying a linear sawtooth wave of voltage to said input circuit, a series combination of resistance and capacitance connected between a point on said coil and said ground point, means for applying the voltage wave developed across said capacitance in inverse phase with respect to said linear sawtooth wave of voltage to said input circuit, the series impedance of said series combination being substantially greater than the impedance of said coil, the product of said resistance and capacitance being of the order of magnitude of the ratio of the resistance of said coil to the inductance thereof whereby said sawtooth wave of voltage is reproduced as a linear sawtooth wave of current in said deflection coil.

References Cited in the file of this patent

UNITED STATES PATENTS

| | | |
|---|---|---|
| 2,251,851 | Moore | Aug. 5, 1941 |
| 2,336,837 | Bedford | Dec. 14, 1943 |
| 2,358,545 | Wendt | Sept. 19, 1944 |
| 2,414,546 | Nagel | Jan. 21, 1947 |
| 2,466,537 | De Vore | Apr. 5, 1949 |
| 2,506,770 | Braden | May 9, 1950 |
| 2,516,797 | Oliver | July 25, 1950 |
| 2,587,313 | Grundmann | Feb. 26, 1952 |
| 2,621,307 | Bull | Dec. 9, 1952 |
| 2,647,173 | Beurtheret | July 28, 1953 |